United States Patent
Sicilia (10) Patent No.: US 7,559,756 B2
(45) Date of Patent: Jul. 14, 2009

(54) APPARATUS AND METHOD FOR ACTUATION OF INJECTION MOLDING SHOOTING POTS

(75) Inventor: Roberto D. Sicilia, Mississauga (CA)

(73) Assignee: Husky Injection Molding Systems, Ltd., Bolton, Ontario (CA)

( * ) Notice: Subject to any disclaimer, the term of this patent is extended or adjusted under 35 U.S.C. 154(b) by 748 days.

(21) Appl. No.: 10/879,575

(22) Filed: Jun. 30, 2004

(65) Prior Publication Data

US 2006/0001195 A1 Jan. 5, 2006

(51) Int. Cl.
*B29C 45/13* (2006.01)

(52) U.S. Cl. .................. 425/130; 425/557; 425/558; 425/559; 425/560; 425/561

(58) Field of Classification Search ........... 425/542, 425/544, 554, 565, 557–561, 573, 575, 577, 425/595, DIG. 226, DIG. 228, DIG. 229, 425/130, 257, 568, 569; 264/328.8, 328.11, 264/328.12

See application file for complete search history.

(56) References Cited

U.S. PATENT DOCUMENTS

| | | | | |
|---|---|---|---|---|
| 3,339,240 | A | * | 9/1967 | Corbett .................. 425/130 |
| 3,979,170 | A | * | 9/1976 | Monnet .................. 425/130 |
| 4,052,497 | A | * | 10/1977 | Monnet .................. 264/255 |
| 4,080,147 | A | * | 3/1978 | Dumortier ............... 425/551 |
| 4,207,051 | A | | 6/1980 | Wright et al. |
| 4,213,751 | A | * | 7/1980 | Fernandez ............... 425/566 |
| 4,315,726 | A | * | 2/1982 | Semerdjiev et al. ....... 425/560 |
| 4,334,847 | A | * | 6/1982 | Schauffele .............. 425/227 |
| 4,479,914 | A | * | 10/1984 | Baumrucker ............. 264/45.5 |
| 4,717,324 | A | | 1/1988 | Schad et al. |
| 4,966,545 | A | | 10/1990 | Brown et al. |
| 4,999,142 | A | * | 3/1991 | Fukushima et al. ........ 264/1.7 |
| 5,044,927 | A | * | 9/1991 | DiSimone et al. ......... 425/567 |
| 5,125,817 | A | * | 6/1992 | Yamachika .............. 425/130 |
| 5,167,896 | A | * | 12/1992 | Hirota et al. ............ 264/255 |
| RE35,256 | E | | 5/1996 | von Buren et al. |
| 6,099,769 | A | * | 8/2000 | Koch .................... 264/51 |
| 6,152,721 | A | | 11/2000 | Schad et al. |
| 6,299,427 | B1 | * | 10/2001 | Bulgrin et al. .......... 425/145 |
| 6,413,076 | B1 | | 7/2002 | Dray, Sr. |

(Continued)

FOREIGN PATENT DOCUMENTS

EP 0 624 449 A2 11/1994

(Continued)

*Primary Examiner*—Philip C Tucker
*Assistant Examiner*—Dimple N Bodawala
(74) *Attorney, Agent, or Firm*—Katten Muchin Rosenman LLP (57) ABSTRACT

Apparatus and method whereby coinjection molding shooting pot actuation structure is configured to be installed in a coinjection hot runner with a coinjection nozzle, the coinjection nozzle having at least two melt channels ending at the same gate. The shooting pot is preferably disposed in one of a mold cavity half and a mold core half. A shooting pot piston is configured to discharge a melt from the shooting pot. A transmission structure is configured to (i) extend through one of the mold cavity half and the mold core half, and (ii) to transmit a force to the shooting pot piston. Actuation structure is disposed on the opposite side of the mold cavity half from the coinjection hot runner, and is configured to provide the force to the transmission structure. This configuration conserves space in the mold.

19 Claims, 8 Drawing Sheets

U.S. PATENT DOCUMENTS

| | | | |
|---|---|---|---|
| 6,544,459 B2 * | 4/2003 | Maruyama et al. | 264/255 |
| 6,626,654 B1 * | 9/2003 | Nakanishi | 425/4 R |
| 2004/0155379 A1 * | 8/2004 | Kajikawa et al. | 264/255 |
| 2006/0003039 A1 * | 1/2006 | Bouti | 425/130 |
| 2006/0003046 A1 * | 1/2006 | Serniuck | 425/564 |

FOREIGN PATENT DOCUMENTS

| | | | |
|---|---|---|---|
| JP | 63216720 A * | 9/1988 |
| JP | 01114408 A * | 5/1989 |
| JP | 02130117 A * | 5/1990 |
| JP | 06262645 A * | 9/1994 |
| WO | WO 02/058908 | 8/2002 |
| WO | WO 02/058908 A1 | 8/2002 |

* cited by examiner

APPARATUS AND METHOD FOR ACTUATION OF INJECTION MOLDING SHOOTING POTS

BACKGROUND OF THE INVENTION

1. Field of the Invention

The present invention relates to an improved coinjection hot runner shooting pot actuation device configured to optimize the space required in the mold structure in order to maintain cavity pitch spacing when compared with similar molds not containing hot runner shooting pots.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same gate. Some coinjection hot runner systems include shooting pots to meter material of one plastic resin so that each cavity of a multi-cavity mold receives an accurate dose of that resin in the molding cycle. Such systems may also use shooting pots to exert supplementary pressure on the melt during the molding process.

U.S. Pat. No. 4,080,147 to Dumortier discloses a multi-cavity mold employing a hot runner having a shooting pot associated with each nozzle/cavity combination. The shooting pot is charged while the mold is open (FIG. 5), the action causes the hot runner assembly to move away from the manifold backing plate a distance "b". The mold is closed in FIG. 6, the action causes a valve to block the melt channel to prevent backflow of the resin toward the feeding unit. Then the distance "b" is closed up by the continuing motion of the machine clamp that causes the resin in the shooting pot to be injected into the mold cavity partially filling it.

WO 02/058908 A1 to Clarke discloses a multi-cavity mold employing a hot runner having shooting pots. The shooting pots are charged while the mold is open without any corresponding movement of the hot runner or cavity plate assembly of the mold. The shooting pots are discharged by the action of closing the mold by the machine clamp, the resin being discharged to completely fill the cavities as the cavity itself closes. The shooting pot piston extends from the cavity side of the mold and is directly acted on by the core plate of the mold during closing. Valves included in the hot runner ensure backflow of the resin toward the feeding unit is prevented during injection.

U.S. Pat. No. 6,152,721 to Schad discloses a shooting pot actuation device that comprises a movable plate mounted behind the stationary platen of the machine having actuation rods extending through the platen to act on the shooting pot pistons mounted in the hot runner of the mold. The hot runner assembly is also mounted to the stationary platen of the mold so the shooting pot piston actuators never separate contact with their corresponding rod actuators mounted on the movable plate.

U.S. Pat. No. 4,966,545 to Brown discloses a shooting pot piston moved in two discrete motions in order to deliver two metered amounts of resin to the same mold cavity from the same shooting pot. The piston is actuated by tandem mounted cylinders in the mold plate and valves are used to prevent backflow to the feeding unit during injection.

U.S. Pat. No. Re. 35,256 to von Buren discloses a clamping piston acting perpendicular to the injection unit's axis to intermittently effect a sealing connection to the hot runner system of the mold. The connection is released and sealed during each molding cycle.

U.S. Pat. No. 5,044,927 to DiSimone discloses a latching mechanism for clamping the injection unit's nozzle to the bushing at the end of sprue bar of a stack mold in order to alleviate unequal clamping. The connection is released and sealed during each molding cycle.

U.S. Pat. No. 4,207,051 to Wright and U.S. Pat. No. 5,910,327 to Schad both disclose a stack mold having a telescoping sprue bar that adjusts its length as the mold opens and closes. However the sprue bar's connection with the injection unit's nozzle is released and sealed during each molding cycle.

U.S. Pat. No. 6,413,076 to Dray discloses a machine nozzle that continuously engages the mold's sprue bushing throughout the molding cycle. An extension from the nozzle remains within a corresponding bore extending from the sprue bushing allowing relative axial movement between the two without separation. The channel through the extension and sprue is open only when the injection unit is advanced toward the mold and consequently relative movement between the two causes a valving action. See also:

U.S. patent application Ser. No. 10/879,576 entitled INJECTION MOLDING MACHINE SHOOTING POT WITH INTEGRAL CHECK VALVE;

U.S. patent application Ser. No. 10/879,581 entitled INJECTION MOLDING MACHINE SPIGOTTED SHOOTING POT PISTON;

U.S. patent application Ser. No. 10/879,621 entitled APPARATUS AND METHOD FOR SEALING INJECTION UNIT AND SPRUE;

U.S. patent application Ser. No. 10/879,582 entitled CONTROL SYSTEM FOR A DYNAMIC FEED COINJECTION PROCESS;

U.S. patent application Ser. No. 10/880,494 entitled HOT RUNNER COINJECTION NOZZLE WITH THERMALLY SEPARATED MELT CHANNELS;

U.S. patent application Ser. No. 10/880,493 entitled COINJECTION MOLDING COOLED SHOOTING POT CYLINDER; and U.S. patent application Ser. No. 10/887,353 entitled APPARATUS AND METHOD FOR INJECTION MOLDING SHOOTING POT WEDGE FEATURE.

Thus, what is needed is an injection molding shooting pot structure which is reliable, easy to assemble, easy to maintain, and which conserves space in the mold, especially for coinjection molding machines having plural mold cavities.

SUMMARY OF THE INVENTION

It is an advantage of the present invention to overcome the problems of the related art and to provide an injection molding machine hot runner system that is reliable, easy to assemble, easy to maintain, and which conserves space in the mold, especially for coinjection molding machines having plural mold cavities.

According to a first aspect of the present invention, a novel combination of structure and/or steps are provided for a coinjection molding shooting pot actuation structure that is configured to be installed in a coinjection hot runner with a coinjection nozzle, the coinjection nozzle having at least two melt channels ending at the same gate. The shooting pot is preferably disposed in one of a mold cavity half and a mold core half. A shooting pot piston is configured to discharge a melt from the shooting pot. A transmission structure is configured to (i) extend through one of the mold cavity half and the mold core half, and (ii) to transmit a force to the shooting pot piston. Actuation structure is disposed on the opposite side of the mold cavity half from the coinjection hot runner, and is configured to provide the force to the transmission structure. This configuration conserves space in the mold.

According to a second aspect of the present invention, a unique combination of structure and/or steps are provided for an injection molding shooting pot actuation apparatus configured to be installed in a coinjection hot runner with a coinjection nozzle, the coinjection nozzle having a longitudinal axis and at least two melt channels ending at the same gate, wherein the shooting pot is disposed in one of a mold cavity half and a mold core half. A shooting pot is coupled to at least one of the mold cavity half and the mold core half, and is configured to discharge melt to the coinjection hot runner. A shooting pot piston is configured to cause the melt in the shooting pot to be discharged to the coinjection hot runner. A moving member is configured to move the shooting pot piston to cause the melt in the shooting pot to be discharged to the coinjection hot runner, and actuation structure is configured to move the moving member. The moving member and the actuation structure are disposed on an opposite side of the mold cavity half from the coinjection hot runner.

According to a third aspect of the present invention, a unique combination of structure and/or steps are provided for an injection molding shooting pot actuation apparatus configured to be installed in a coinjection hot runner with a coinjection nozzle, the coinjection nozzle having at least two melt channels ending at the same gate, wherein the shooting pot is disposed in one of a mold cavity half and a mold core half. A shooting pot is configured to be disposed in a mold plate which moves with respect to a stationary plate, and a shooting pot piston is configured to discharge the shooting pot. Shooting pot piston actuation structure is configured to move the shooting pot piston from a side of the mold plate that is opposite the side which contacts the stationary plate.

According to a fourth aspect of the present invention, a unique combination of steps are provided for method of activating a shooting pot in an injection molding shooting pot actuation apparatus that is configured to be installed in a coinjection hot runner with a coinjection nozzle, the coinjection nozzle having at least two melt channels ending at the same gate, wherein the shooting pot is disposed in one of a mold cavity half and a mold core half. The method includes the steps of: (i) charging a shooting pot with melt when the mold core half and the mold cavity half are closed, the shooting pot being disposed in at least one of the mold core half and the mold cavity half; and (ii) using a shooting pot piston actuation structure that extends through at least one of the mold core half and the mold cavity half to cause a shooting pot piston to discharge the melt from the shooting pot.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. Introduction

The present invention will now be described with respect to several embodiments in which a plastic resin coinjection molding machine injects "A" and "C" resins through a coinjection nozzle into a mold cavity. However, the present invention will find applicability in single plastic molding machines, and/or molding machines which mold other melts such as metal, composites, etc.

2. The Structure of the Preferred Embodiment

FIGS. 1-7 are schematic section views of a coinjection hot runner mold, showing various parts of the machine at various stages during a molding cycle which produces a molded part having multilayered walls. The mold includes a core block 10, and a cavity block 11 that together form a mold cavity 12. A coinjection hot runner nozzle 13 includes a first melt channel 14 (for conveying a plastic resin "A") and second melt channel 15 (for conveying a different plastic resin "C"). The nozzle 13 is maintained at operating temperature by a heater 16, and is located in the cavity block 11 by a locating insulator 17. The nozzle 13 is preferably urged into sealing contact with a first hot runner manifold 30 and a second hot runner manifold 40 by spring pack 18. The nozzle 13 also contains a valve stem 19 that is actuated by piston 20 in cylinder 21 to open and close gate 22 that connects melt channels 14 and 15 to mold cavity 12. See U.S. patent application Ser. No. 10/879,576 entitled INJECTION MOLDING MACHINE SHOOTING POT WITH INTEGRAL CHECK VALVE.

The mold has two hot runner manifolds. The first hot runner manifold 30 handles the resin "A" and is maintained at optimum operating temperature for the resin "A" by first heaters 31. Attached to the manifold 30 is a first sprue bushing 32 that conveys the resin "A" from a first injection unit 33. Also attached to the manifold 30 is a first shooting pot 34 that contains a first shooting pot piston 35. The second hot runner manifold 40 handles the resin "C" and is maintained at optimum operating temperature for the resin "C" by second heaters 41. Attached to the manifold 40 is a second sprue bushing 42 that conveys the resin "C" from a second injection unit 43. Also attached to manifold 40 is a second shooting pot 44 that contains a second shooting pot piston 45. As an example, the distance between the second shooting pot 44 and the nozzle 13 may be 60,0 mm.

The second manifold 40 is preferably spaced away from the first manifold 30, urged by a compensation element 46. Both of the manifolds 30 and 40 are preferably located in a manifold plate 50 that is bolted to the cavity block 11 by fastening means (not shown). Both of the manifolds 30 and 40 seal against the nozzle 13 such that their respective melt channels align and seal with their counterpart melt channels in the nozzle 13 to convey the resins "A" and "C", respectively, from the shooting pots 34 and 44 to the mold cavity 12 when a valve stem 19 is open and the respective shooting pot pistons are actuated.

Figure 1:
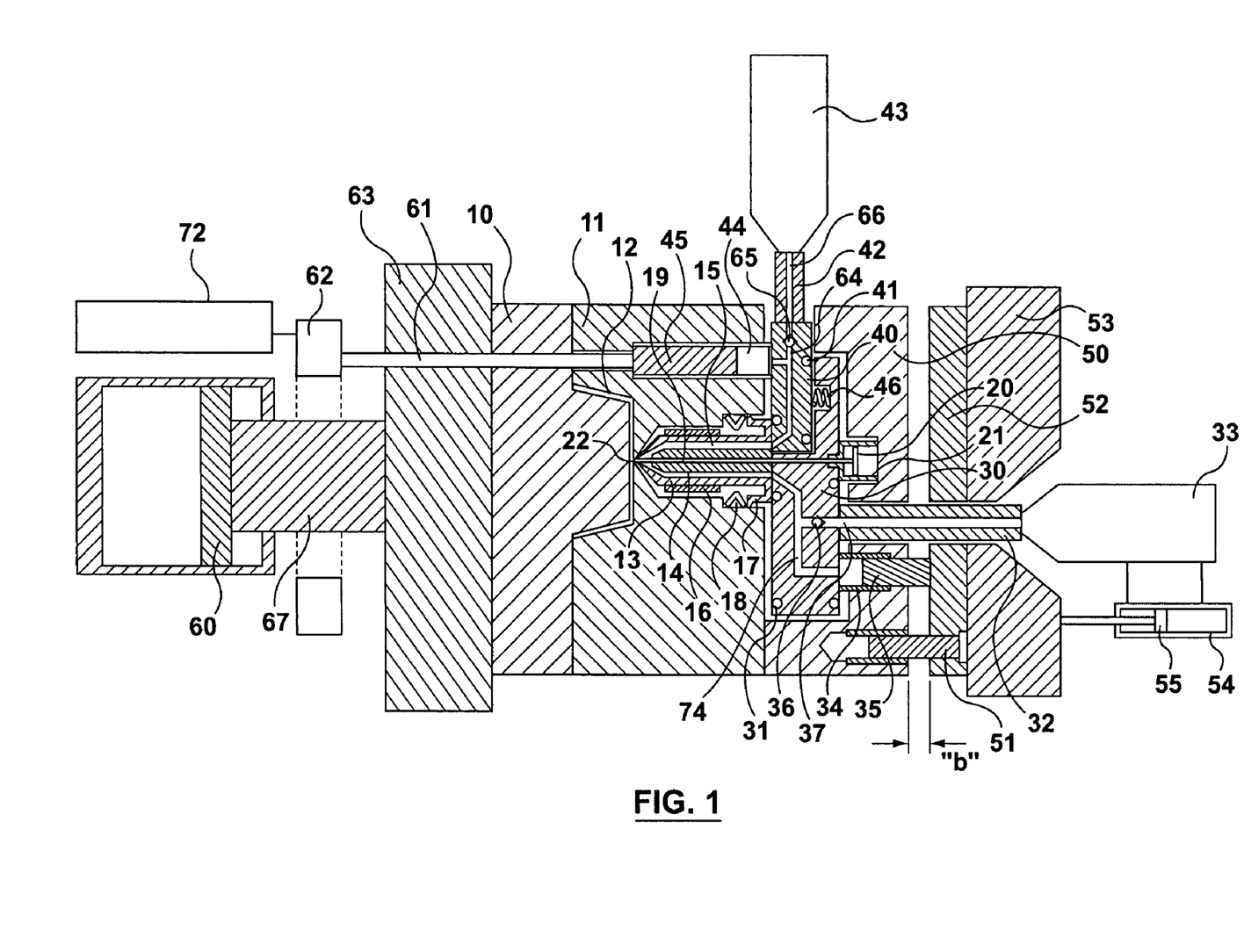
FIG. 1 is a schematic section view of a coinjection hot runner mold at the beginning of a molding cycle with both shooting pots charged and the mold closed.

The manifold plate 50 is located and guided on guide pins 51 mounted in a manifold backing plate 52 that is fastened to a machine stationary platen 53. When the first injection unit 33 charges the first shooting pot 34 with the resin "A", the entry of the resin into the shooting pot displaces the manifold/cavity block assembly away from the manifold backing plate 52 a distance of "b", as shown in FIG. 1. The actuation of a machine clamp piston 60 via a column 67 that is attached to a moving platen 63 causes the mold assembly to move towards the stationary platen 53, thereby closing or taking up the distance "b", thus causing the first shooting pot piston 35 to inject the resin "A" from the first shooting pot 34 into the nozzle housing melt channel 14, and thereby into the mold cavity 12. A ball check valve 36 in a feed channel 37 prevents backflow of the injected resin back into the first injection unit 33. The first injection unit 33 is maintained in sealing contact with the sprue bushing 32 during these movements of the manifolds 30 and 40 and the cavity block 11 by means of a cylinder 54 that is connected to the first injection unit 33 and a piston 55 that is connected to the stationary platen 53.

Figure 8:
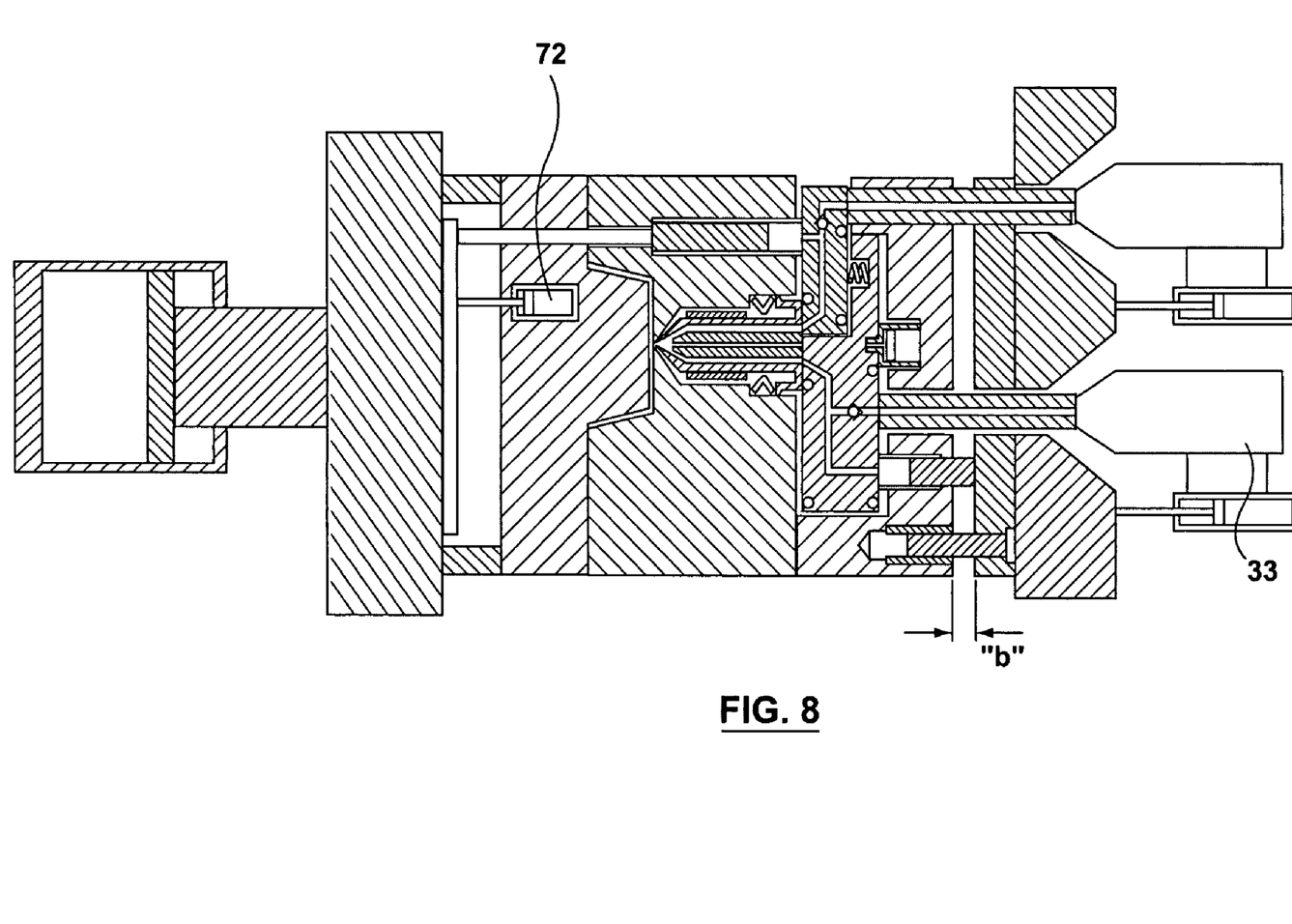
FIG. 8 is a schematic section view of an alternate embodiment in which both injection units are mounted in parallel and the "C" actuation means is incorporated within the mold.

The second shooting pot piston 45 is actuated by a rod (or other transmission structure) 61 that is connected to a plate 62 that is mounted behind the moving platen 63, or alternatively within the mold core half structure as shown in FIG. 8, and is moved by cylinder means or other actuation structure 72. Of course, in a multi-cavity mold, the actuation structure 72 may move more than one of the rods 61. The rod 61 is preferably co-axial with the second shooting pot piston 45, and parallel to a longitudinal axis of the nozzle 13. When the second injection unit 43 charges the second shooting pot 44 with the resin "C", the entry of the resin into the shooting pot displaces the second shooting pot piston 45, the rod 61, and the plate 62 away from the second manifold 40. The forward movement of the plate 62 causes the rod 61 to advance the second shooting pot piston 45 and discharge the resin "C from the second shooting pot 44 via the channel 64 in the second manifold 40, the channel 15 in the nozzle 13, and into the mold cavity 12 via the open gate 22. The second ball check valve 65 in the feed channel 66 prevents backflow of the injected resin into the second injection unit 43. The second injection unit 43 is mounted atop the mold assembly and travels with the movable section of the mold, thereby maintaining its sealing contact with sprue 42 throughout the molding cycle, or alternatively is mounted alongside the first injection unit 33 and is connected via a hole in the stationary platen directly to a sprue extension attached to the second manifold as shown in FIG. 8.

3. The Process of the Preferred Embodiment

Figure 2:
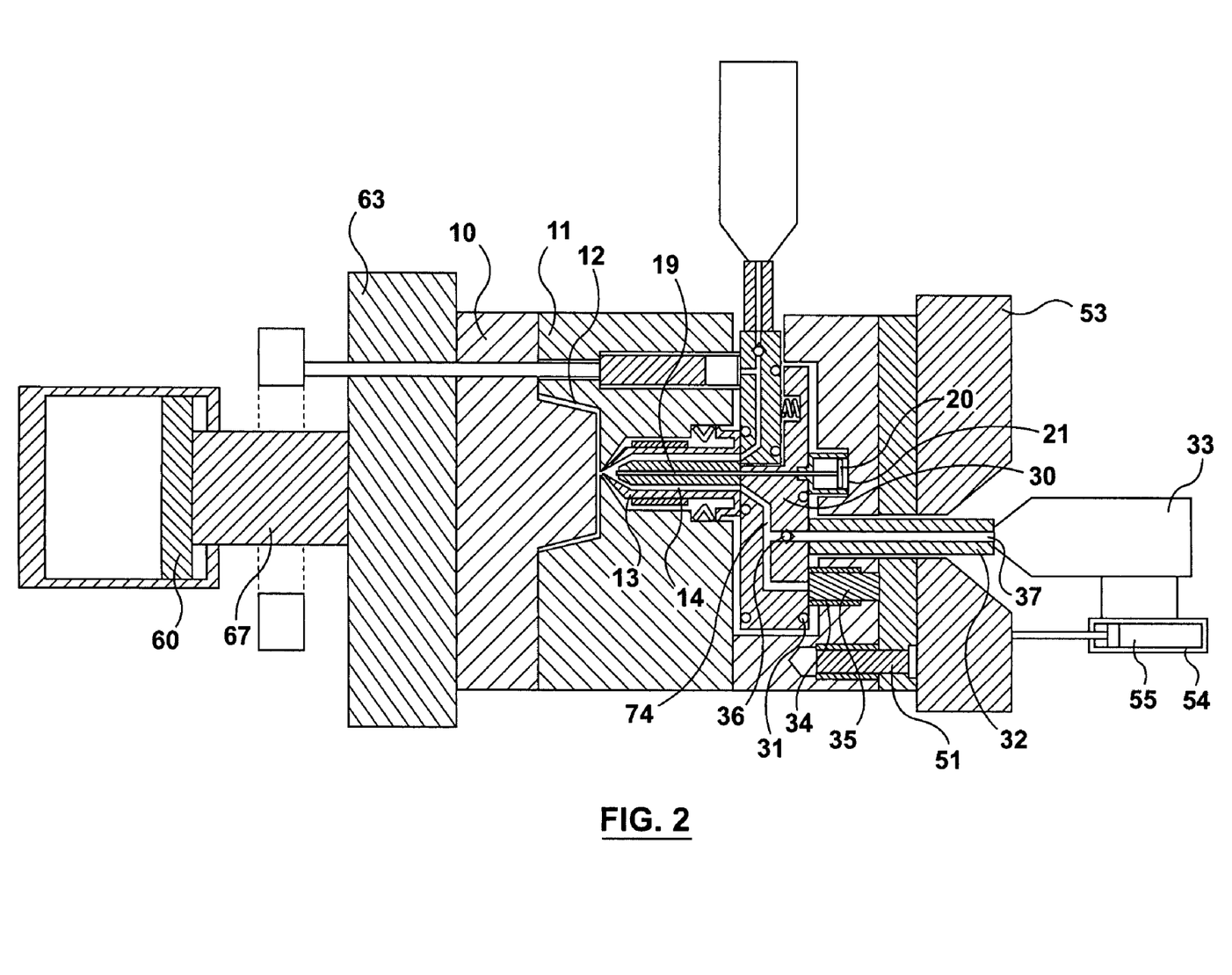
FIG. 2 is a schematic section view of the FIG. 1 embodiment showing the next stage of the molding cycle in which the clamp activates one of the shooting pots to inject the "A" resin into the mold.

In operation, the molding cycle starts with the configuration shown in FIG. 1, that is, both of the shooting pots 34 and 44 are charged with their respective resins, the valve gate 19 is closed and, the mold is closed. FIG. 2 shows the next step in the molding cycle. The valve gate 19 has been opened by the piston 20, the machine clamp piston 60 has been actuated to move column 67, which in turn moves the moving platen 63, the mold core block 10, the mold cavity block 11, and the manifold assemblies 30 and 40 toward the stationary platen 53 until distance "b" has been taken up. This action displaces the first shooting pot piston 35 that injects the resin "A" in the first shooting pot 34 into the mold cavity 12 via the channel 74 in the first manifold 30 and the first melt channel 14 in the nozzle 13. This metered first shot of resin "A" at least partially fills the mold cavity 12.

Figure 3:
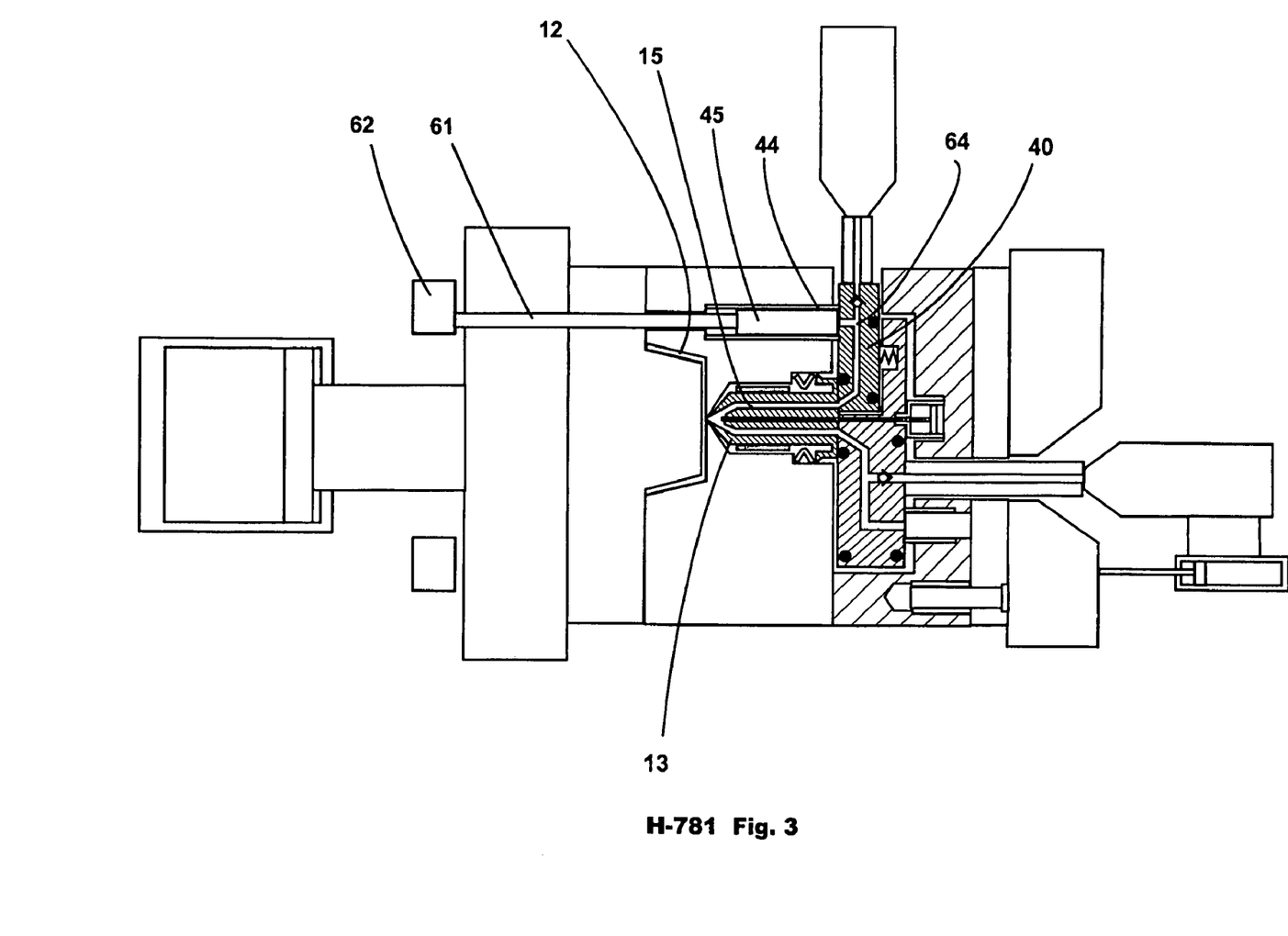
FIG. 3 is a schematic section view of the FIG. 1 embodiment showing the next stage of the molding cycle in which the plate behind the moving platen activates the other of the shooting pots to inject the "C" resin into the mold.

FIG. 3 shows the next step in the molding cycle. The plate 62 is actuated to push the rod 61 against the second shooting pot piston 45 that injects the resin "C" inside the second shooting pot 44 into the mold cavity 12 via the channel 64 in the second manifold 40 and the second melt channel 15 in the nozzle 13. This metered second shot of resin "C" flows within the earlier metered shot of resin "A" pushing it further along the cavity and setting up a multilayered wall in the part in known fashion. The combined amounts of resin injected so far preferably only partially fill the mold cavity 12.

Figure 4:
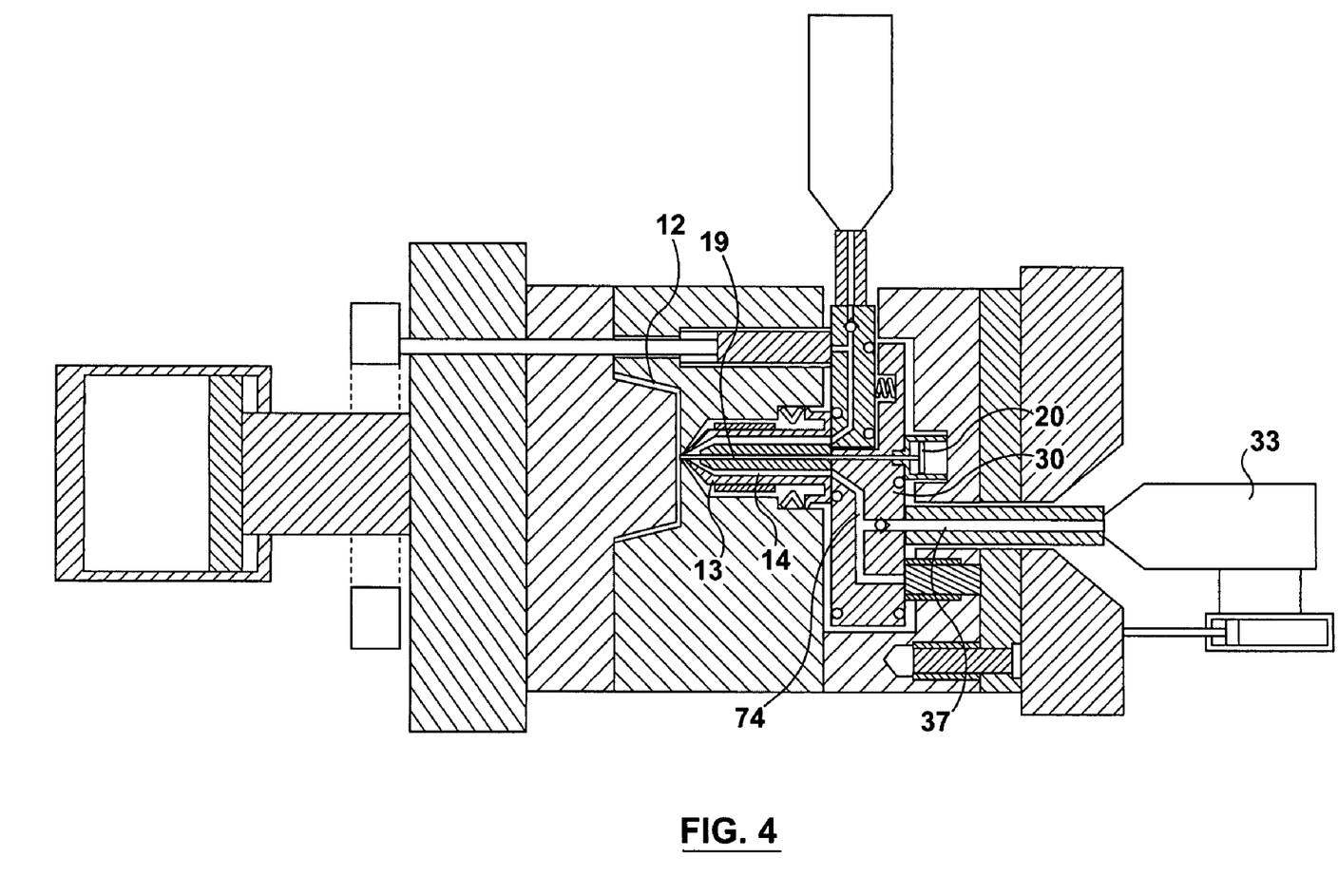
FIG. 4 is a schematic section view of the FIG. 1 embodiment showing the next stage of the molding cycle in which the valve gate is closed and the molded part is cooling.

FIG. 4 shows the next step in the molding cycle. The first injection unit 33 injects a third shot of resin "A" directly through the melt channel 37 in the sprue, the channel 74 in the first manifold 30 and the first melt channel 14 in the nozzle 13 to fill and pack the mold cavity 12. After a brief interval of holding pressure, valve stem 19 is closed by piston 20 and the molded part is allowed to cool.

Figure 5:
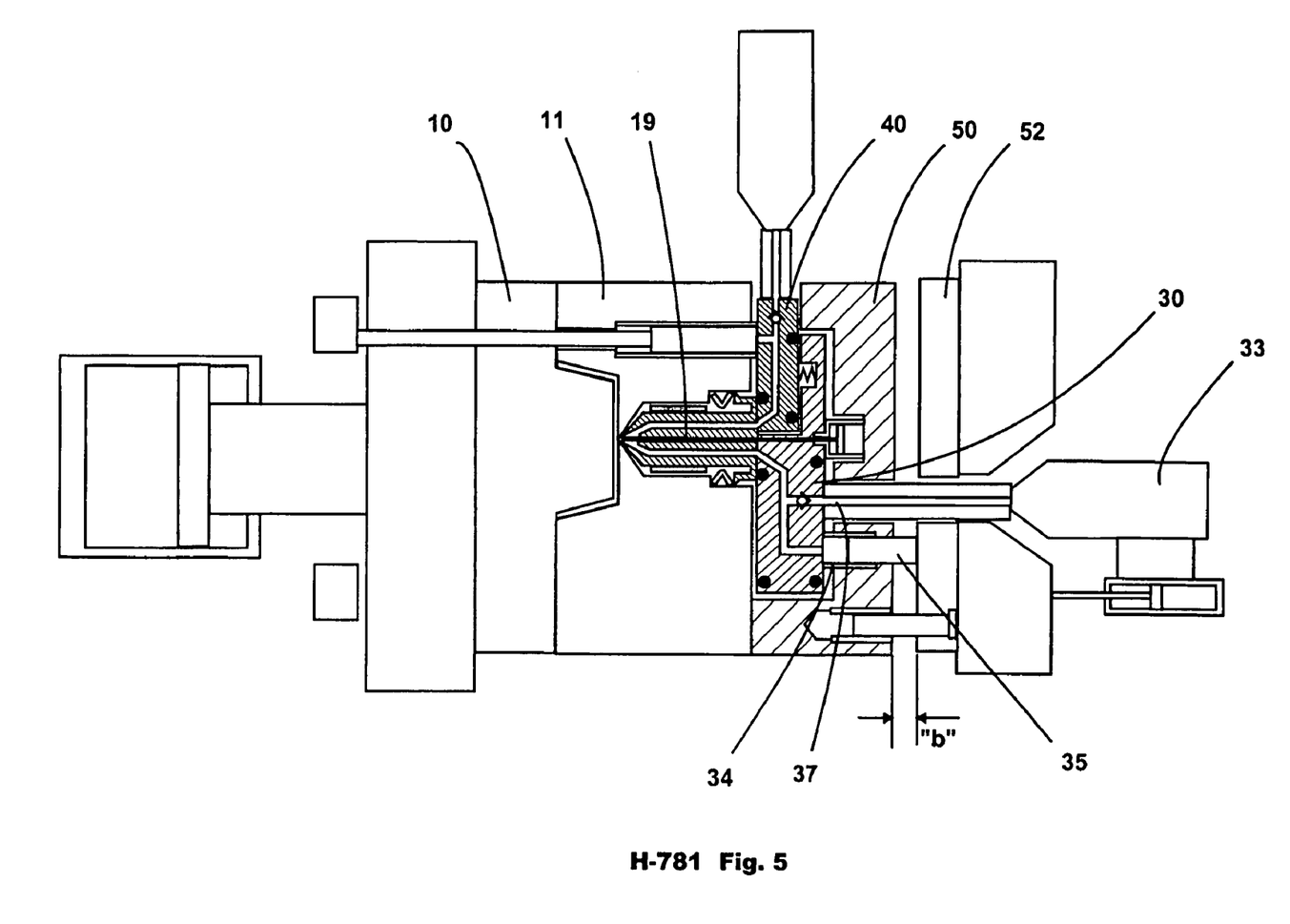
FIG. 5 is a schematic section view of the FIG. 1 embodiment showing the next stage of the molding cycle in which the "A" injector unit charges the "A" shooting pot.

FIG. 5 shows the next step in the molding cycle. During the cooling of the part, the first shooting pot 34 is recharged with resin "A" by the first injector 33, feeding resin through the feed melt channel 37. Because the valve stem 19 is in the closed position, the incoming resin "A" can only flow into the first shooting pot 34, thereby displacing the first shooting pot piston 35 that in turn pushes the movable mold portion (comprising the core block 10, the cavity block 11, the manifolds 30 and 40, and the manifold plate 50) away from the manifold backing plate 52, thus creating the space "b" between them.

Figure 6:
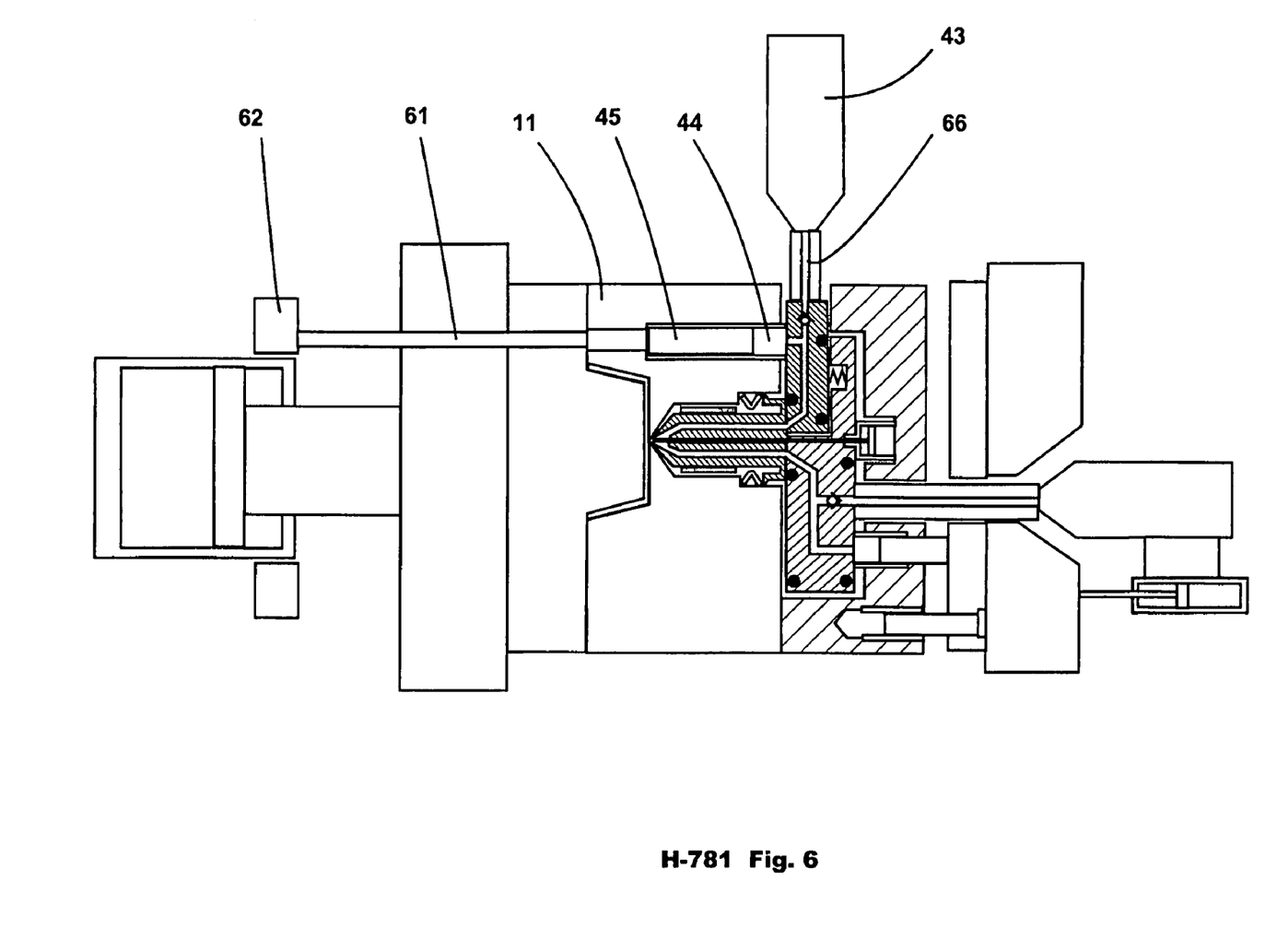
FIG. 6 is a schematic section view of the FIG. 1 embodiment showing the next stage of the molding cycle in which the "C" injector unit charges the "C" shooting pot.

FIG. 6 shows the next step in the molding cycle. During the continued cooling of the part, the second shooting pot 44 is recharged with the resin "C" by the second injector 43, feeding resin through the feed channel 66. Because valve stem 19 is in the closed position, the incoming resin "C" can only flow into the second shooting pot 44, thereby displacing the second shooting pot piston 45, that in turn pushes back the rod 61 and the plate 62. This recharging activity can take place simultaneously with the recharging of the "A" resin in the first shooting pot 34, since both of the manifolds 30 and 40 (and their respective injection units 33 and 43, respectively) can be operated independently. After the second shooting pot 44 is recharged, the plate 62 is activated by actuator 72 to continue to retract the rod 61 so that its distal end clears the cavity block 11 as shown in FIG. 6. This is to ensure that the rod 61 is not exposed above the mold parting line when the mold is opened, as shown in FIG. 7.

Figure 7:
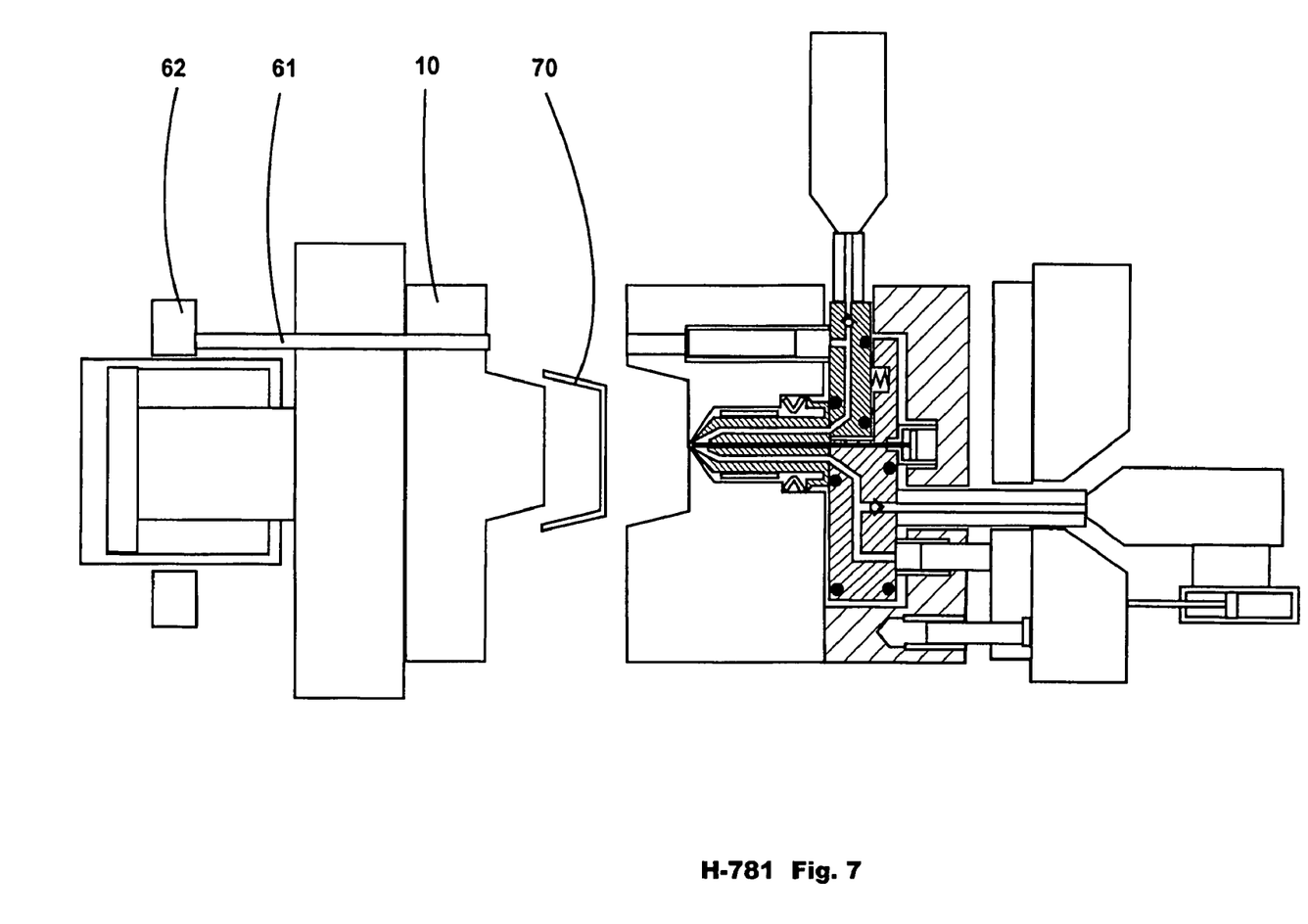
FIG. 7 is a schematic section view of the FIG. 1 embodiment showing the next stage of the molding cycle in which the mold is in open position and the part is being ejected.

FIG. 7 shows the next step in the molding cycle. The part has cooled sufficiently to be ejected so the mold is opened and the part 70 is ejected off the core block 10 in a conventional manner. Note that the rod 61 has been retracted to clear the parting line so that a robot may enter between the open mold halves to pick up the ejected part, if necessary. Both of the shooting pots 34 and 44 have been re-charged in the previous step and are ready for injection when the mold closes in the next step, which is the first step of the next molding cycle. As an example, the entire molding cycle may take about 12 seconds.

4. Conclusion

Advantageous features according to the present invention include:

A shooting pot piston actuated by structure that operates from a side of the mold opposed to that in which the shooting pot piston is mounted, and such structure is actuated after the mold has been closed.

A shooting pot actuation structure that requires no additional space within the mold that would cause the spacing between adjacent mold cavities to be increased or the outer dimensions of the mold to be increased when compared to a mold for the same part, and compared to cavitation that does not include a shooting pot. For example a 96-cavity coinjection mold may have the same width and breadth (mold area on the platen) as a 96 cavity monolayer mold for the same size perform.

Thus, what has been described is apparatus and process for an injection molding shooting pot structure that is reliable, easy to assemble, easy to maintain, and which conserves space in the mold, especially for coinjection molding machines having plural mold cavities.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patents and patent applications discussed above are hereby incorporated by reference into the Detailed Description of the Preferred Embodiments.

What is claimed is:

1. An injection molding shooting pot actuation apparatus configured to be installed in a coinjection hot runner with a coinjection nozzle, the coinjection nozzle having at least two melt channels ending at the same gate, said apparatus comprising:
    a shooting pot disposed in one of a mold cavity half and a mold core half;
    a shooting pot piston configured to discharge a melt from the shooting pot to the coinjection hot runner;
    transmission structure configured to (i) extend through one of the mold cavity half and the mold core half, and (ii) to transmit a force to said shooting pot piston;
    actuation structure disposed on the opposite side of the mold cavity half from the coinjection hot runner, and configured to provide the force to said transmission structure;
    a second shooting pot disposed in the one of said mold cavity half and said mold core half in which said shooting pot is not disposed;
    a second shooting pot piston that is configured to (i) discharge a second melt from the second shooting pot to the coinjection hot runner, (ii) to move in a melt-discharge direction that is opposite to a melt-discharge direction of said shooting pot piston, and (iii) to be actuated by a movement of a moving platen with respect to a stationary platen; and
    said second shooting pot being disposed on an opposite side of said coinjection hot runner from said shooting pot.

2. Apparatus according to claim 1, wherein said actuation structure is configured to provide the force after the mold cavity half and the mold core half have closed.

3. Apparatus according to claim 1, wherein said shooting pot is disposed in the mold cavity half adjacent and substantially parallel to the coinjection nozzle, and wherein said transmission structure comprises a rod extending through the mold core half and into the mold cavity half.

4. Apparatus according to claim 3, wherein said actuation structure comprises a cylinder configured to actuate said rod.

5. Apparatus according to claim 3, wherein said rod is configured so as to not project from a side of the mold core half which faces the mold cavity half, when the mold core half and the mold cavity half are fully opened.

6. Apparatus according to claim 1, wherein said apparatus is configured to be disposed in a coinjection plastic injection mold.

7. Apparatus according to claim 6, wherein the coinjection plastic injection mold has a plurality of mold cavities, and further comprising, for each cavity, at least one said shooting pot piston, and at least one said transmission structure.

8. Apparatus according to claim 1, wherein said shooting pot piston and said transmission structure are disposed coaxially and substantially parallel to a longitudinal axis of the coinjection nozzle.

9. Apparatus according to claim 1, wherein the mold cavity half includes the coinjection hot runner, and wherein said shooting pot is configured to discharge melt into the coinjection hot runner.

10. An injection molding shooting pot actuation apparatus configured to be installed in a coinjection hot runner with a coinjection nozzle, the coinjection nozzle having a longitudinal axis and at least two melt channels ending at the same gate, said apparatus comprising:
    a shooting pot disposed in one of a mold cavity half and a mold core half;
    a shooting pot coupled to at least one of the mold cavity half and the mold core half, and configured to discharge melt to the coinjection hot runner;
    a shooting pot piston configured to cause melt in said shooting pot to be discharged to the coinjection hot runner;
    a moving member configured to move said shooting pot piston to cause the melt in said shooting pot to be discharged to the coinjection hot runner;
    actuation structure configured to move said moving member;
    said moving member and said actuation structure being disposed on an opposite side of the mold cavity half from the coinjection hot runner;
    a second shooting pot disposed in the one of said mold cavity half and said mold core half in which said shooting pot is not disposed;
    a second shooting pot piston that is configured to (i) discharge a second melt from the second shooting pot to the coinjection hot runner, (ii) to move in a melt-discharge direction that is opposite to a melt-discharge direction of said shooting pot piston, and (iii) to be actuated by a movement of a moving platen with respect to a stationary platen; and
    said second shooting pot being disposed on an opposite side of said coinjection hot runner from said shooting pot.

11. Apparatus according to claim 10, wherein the coinjection nozzle is configured to be disposed in the mold cavity half, and wherein the coinjection hot runner is coupled to said mold cavity half on a side thereof opposite to the cavity.

12. Apparatus mold according to claim 11, wherein said shooting pot is provided in said mold cavity half substantially adjacent to the coinjection nozzle, and wherein said shooting pot has a longitudinal axis substantially parallel to the longitudinal axis of the coinjection nozzle.

13. Apparatus according to claim 12, wherein said moving member is configured to extend into said mold cavity half from a cavity side thereof.

14. Apparatus according to claim 13, wherein said moving member is configured to extend through said mold core half, and wherein said actuation structure is disposed on a side of said mold core half opposite the cavity.

15. Apparatus according to claim 10, wherein said actuation structure and said moving member are configured to move said shooting pot piston after the mold core half and the mold cavity half are closed.

16. Apparatus according to claim 10, wherein said second shooting pot is disposed on an opposite side of said coinjection nozzle from said shooting pot.

17. Apparatus according to claim 16, wherein the coinjection hot runner is configured to be movable with respect to a stationary platen, and wherein the mold core half is configured to be movable with respect to the stationary platen, and further comprising:
  a sprue bushing fixedly coupled to the coinjection hot runner; and
  coupling structure configured to (i) fixedly couple an injection unit to said sprue bushing, and (ii) movably couple the injection unit to the stationary platen.

18. Apparatus according to claim 17, wherein said second shooting pot piston is configured to be fixedly coupled to the stationary platen.

19. An injection molding shooting pot actuation apparatus configured to be installed in a coinjection hot runner with a coinjection nozzle, the coinjection nozzle having at least two melt channels ending at the same gate, said apparatus comprising:
  a shooting pot disposed in one of a mold cavity half and a mold core half;
  a shooting pot configured to be disposed in a mold plate which moves with respect to a stationary plate;
  a shooting pot piston configured to discharge said shooting pot;
  shooting pot piston actuation structure configured to move said shooting pot piston from a side of the mold plate opposite the side which contacts the stationary plate;
  a second shooting pot disposed in the one of said mold cavity half and said mold core half in which said shooting pot is not disposed;
  a second shooting pot piston that is configured to (i) discharge a second melt from the second shooting pot to the coinjection hot runner, (ii) to move in a melt-discharge direction that is opposite to a melt-discharge direction of said shooting pot piston, and (iii) to be actuated by a movement of the moving plate with respect to the stationary plate; and
  said second shooting pot being disposed on an opposite side of said coinjection hot runner from said shooting pot.

* * * * *